W. FRANK.
Plow.
No. 39,639. Patented Aug. 25, 1863.
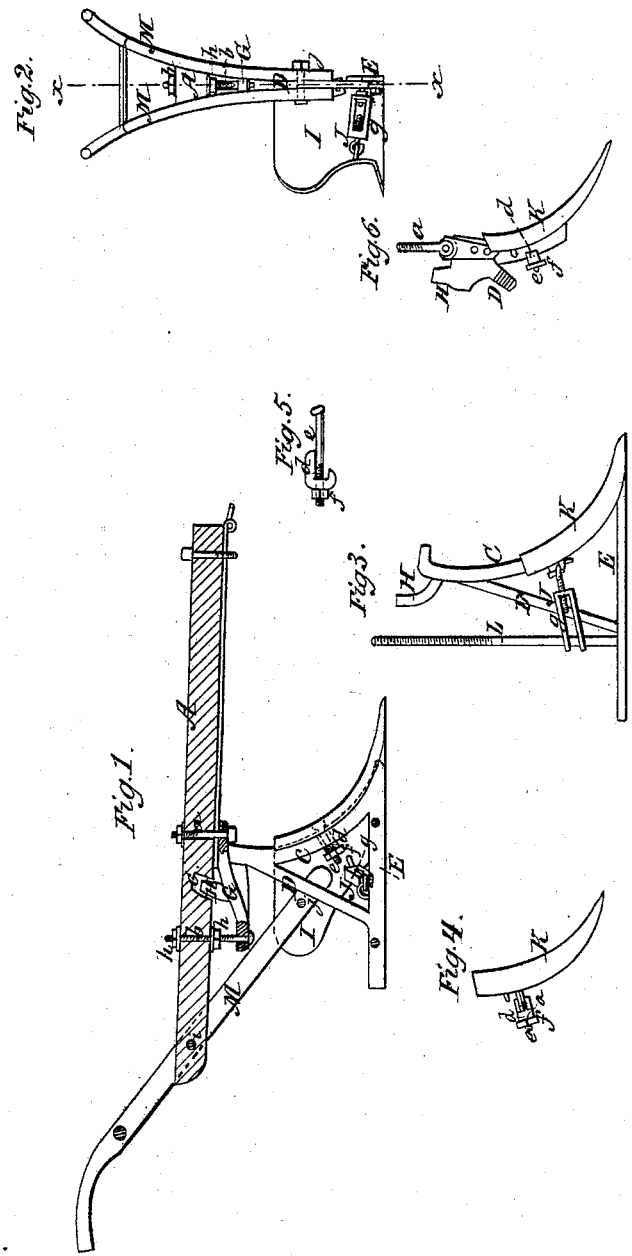

UNITED STATES PATENT OFFICE.

WILLIAM FRANK, OF ST. LOUIS, MISSOURI.

IMPROVEMENT IN PLOWS.

Specification forming part of Letters Patent No. 39,639, dated August 25, 1863.

*To all whom it may concern:*

Be it known that I, WILLIAM FRANK, of St. Louis, in the county of St. Louis and State of Missouri, have invented a new and Improved Plow; and I do hereby declare that the following is a full, clear, and exact description of the same, reference being had to the accompanying drawings, making a part of this specification, in which—

Figure 1 is a side view of a plow constructed according to my invention, and having its beam bisected longitudinally, as indicated by the line $x\ x$, Fig. 2; Fig. 2, a back view of the same; Figs. 3, 4, 5, and 6, detached views of parts pertaining to the same.

Similar letters of reference indicate corresponding parts in the several figures.

The object of this invention is to obtain a plow which may be readily adjusted for plowing deep or shallow, as may be required, and also readily adjusted so as take more or less "land"—that is to say, to turn a furrow-slice of greater or less width—and at the same time be capable of having different shares and mold-boards attached to it, to suit different kinds of work.

To enable those skilled in the art to fully understand and construct my invention, I will proceed to describe it.

A represents the beam of the plow, which may be constructed in the ordinary way; and C represents a standard, D a brace, E a horizontal bar, G a top bar, and H a segment-guide, which may all be cast in one piece. These parts are all shown in Fig. 1, and they are attached to the beam A by means of a bolt, $a$, which passes through the front end of the top bar, G, and through the beam A, and by a bolt, $b$, which passes through the back end of the top bar, G, and through the beam. The guide H is fitted in a slot, $c$, in the beam, as shown clearly in Fig. 1.

I represents the mold-board and share, all in one piece and of the usual turn-furrow form. The mold-board is secured to the standard C by means of a hook, $d$, which catches on the back edge of the standard, and has a screw-bolt, $e$, passing through it and through the mold-board, the nut $f$ of the screw-bolt being behind the hook $d$.

J represents what may be termed a "swivel-screw" brace, one end of which is connected to the inner side of the mold-board I, and the opposite end attached to the bar E. By turning the nut $g$ of the brace J it will be seen that the mold-board may have its share more or less to the right or left, to or from land, and the width of the furrow-slice may therefore be regulated as desired; and it will also be seen that by unscrewing the nut $f$ of the bolt $e$, and thereby loosening the hook $d$, the mold-board and share may be adjusted downward on the standard C, so as to compensate for wear. Besides these two adjustments there is another to regulate the depth of the penetration of the share into the earth. This is effected by raising and lowering the back end of the top bar, G, through the medium of the screw-bolt $b$, said bolt having two jam-nuts, $h\ h$, upon it, one above and the other below the beam A. All these adjustments are obtained by very simple means, which does not render the plow more complicated nor more expensive than the first-class plows now in use.

This invention is applicable to all the different kinds of mold-boards which are in general use. The shovel-plow K, however, may be adjusted so as to plow at a greater or less depth by having a screw-rod, L, attached to the bar E and passing up through the beam A, as shown in Fig. 3. In this case, also, the screw-bolt $e$ may pass through a slot in the standard C and the hook $d$ be dispensed with. The swivel-screw brace J is attached to the rod L, or the hook $d$ may be employed, as shown in Figs. 4 and 5.

The handles of the plow, which are designated by M, are secured to the back part of the beam A by a bolt, $i$, and the lower ends of the handles have a screw-bolt, $j$, passing through them, which serves as a clamp to secure said ends of the handles to the brace D. By loosening the nut of the bolt $j$ the upper ends of the handles may be raised or lowered to suit the height of the plowman.

Having thus described my invention, what I claim as new, and desire to secure by Letters Patent, is—

1. The standards C, brace D, lower and top bars, E G, and guide H, all combined and applied to the beam A as shown, for the purpose specified.

2. The securing of the mold-board I to the standards C and bar E by means of the hook $d$ and screw-bolt $e$ and the swivel-screw brace J, substantially as and for the purpose specified.

WILLIAM FRANK.

Witnesses:
THEODORE STOCK,
ALDELLO DENMAN,
F. A. H. SCHNEIDER.